(12) United States Patent
Goode et al.

(10) Patent No.: US 12,221,392 B2
(45) Date of Patent: *Feb. 11, 2025

(54) APPARATUS FOR GAS ENTRAINMENT VIA NANO-BUBBLES INTO CONCRETE UPSTREAM FROM A PRODUCT MOLD

(71) Applicant: Columbia Machine, Inc., Vancouver, WA (US)

(72) Inventors: Richard T. Goode, Vancouver, WA (US); Jason Clark, Portland, OR (US); Stacy Gildersleeve, Woodland, WA (US)

(73) Assignee: Columbia Machine, Inc., Vancouver, WA (US)

(*) Notice: Subject to any disclaimer, the term of this patent is extended or adjusted under 35 U.S.C. 154(b) by 248 days.

This patent is subject to a terminal disclaimer.

(21) Appl. No.: 17/885,263

(22) Filed: Aug. 10, 2022

(65) Prior Publication Data

US 2022/0380267 A1    Dec. 1, 2022

Related U.S. Application Data

(62) Division of application No. 16/353,992, filed on Mar. 14, 2019, now Pat. No. 11,591,268.

(51) Int. Cl.
| | | |
|---|---|---|
| C04B 40/02 | (2006.01) | |
| B28C 5/06 | (2006.01) | |
| B28C 5/14 | (2006.01) | |
| B28C 7/00 | (2006.01) | |
| B28C 7/02 | (2006.01) | |
| B28C 7/12 | (2006.01) | |
| C04B 40/00 | (2006.01) | |
| B28B 13/02 | (2006.01) | |

(52) U.S. Cl.
CPC .......... *C04B 40/0231* (2013.01); *B28C 5/06* (2013.01); *B28C 5/142* (2013.01); *B28C 7/0007* (2013.01); *B28C 7/024* (2013.01); *B28C 7/12* (2013.01); *C04B 40/0039* (2013.01); *B28B 13/023* (2013.01); *Y02P 40/18* (2015.11)

(58) Field of Classification Search
None
See application file for complete search history.

(56) References Cited

U.S. PATENT DOCUMENTS

2020/0282595 A1*  9/2020  Monkman ............ B28C 5/003

* cited by examiner

*Primary Examiner* — Yung-Sheng M Tsui
(74) *Attorney, Agent, or Firm* — Schaffer IP Law, LLC

(57) ABSTRACT

An apparatus for delivering a wet concrete mix to a product mold, where the apparatus comprises a hopper configured to retain a fresh concrete mix, a source of treated water having a concentration of nanobubbles of a gas at least double a natural concentration of nanobubbles of the gas within a natural state of the water, a water transport coupling the source of treated water with the hopper, a valve interposed within the water transport for selectively releasing the treated water into the hopper, and a mixer in communication with the hopper for mixing the treated water with the fresh concrete mix to yield an infused wet concrete.

16 Claims, 3 Drawing Sheets

APPARATUS FOR GAS ENTRAINMENT VIA NANO-BUBBLES INTO CONCRETE UPSTREAM FROM A PRODUCT MOLD

CROSS-REFERENCES TO RELATED APPLICATIONS

This application is a divisional application and claims the benefit of U.S. patent application Ser. No. 16/353,992, filed Mar. 14, 2019, whose contents are incorporated herein for all purposes.

BACKGROUND OF THE INVENTION

1. Field of the Invention

The present disclosure relates to methods of and apparatuses for making concrete products, and specifically toward novel methods and systems for gas entrainment using nanobubbles to, among other advantages, reducing the greenhouse gas emissions associated with making concrete products and for sequestering carbon dioxide.

2. Description of the Prior Art

Concrete products machines (CPM) are designed to form various molded concrete products such as blocks and pavers that are then cured and used in construction projects. Prior art machines for forming concrete products within a mold assembly include a product forming section comprising a stationary frame, an upper compression beam and a lower stripper beam. The mold assembly includes a head assembly that is mounted on the compression beam, and a mold box that is mounted on the frame and receives concrete material from a feed drawer. An example of such a system is shown in U.S. Pat. No. 5,807,591 which describes an improved concrete products forming machine (CPM) assigned in common to the assignee of the present application and herein incorporated by reference for all purposes.

Concrete is typically formed from a mixture of Portland cement, aggregates, sand, and water. But the process for making cement is the third largest source of greenhouse gas pollution in the U.S. according to the U.S. Environmental Protection Agency as it requires often heating limestone and other ingredients to 2,640° F. by burning fossil fuels. Making one ton of cement thus results in the emission of roughly one ton of $CO_2$—and in some cases much more.

One solution proposed for reducing greenhouse gas emission in the formation of concrete is through carbon capture during the production of concrete products.

U.S. Pat. No. 4,117,060 (Murray) describes a method and apparatus for the manufacture of products of concrete or like construction, in which a mixture of calcareous cementitious binder substance, such as cement, an aggregate, a vinyl acetate-dibutyl maleate copolymer, and an amount of water sufficient to make a relatively dry mix is compressed into the desired configuration in a mold, and with the mixture being exposed to carbon dioxide gas in the mold, prior to the compression taking place, such that the carbon dioxide gas reacts with the ingredients to provide a hardened product in an accelerated state of cure having excellent physical properties.

U.S. Pat. No. 4,362,679 (Malinowski) describes a method of casting different types of concrete products without the need of using a curing chamber or an autoclave subsequent to mixing. The concrete is casted and externally and/or internally subjected to a vacuum treatment to have it de- watered and compacted. Then carbon-dioxide gas is supplied to the mass while maintaining a sub- or under-pressure in a manner such that the gas diffuses into the capillaries formed in the concrete mass, to quickly harden the mass.

U.S. Pat. No. 5,935,317 (Soroushian et al.) describes a CO2 pre-curing period used prior to accelerated (steam or high-pressure steam) curing of cement and concrete products in order to: prepare the products to withstand the high temperature and vapor pressure in the accelerated curing environment without microcracking and damage; and incorporate the advantages of carbonation reactions in terms of dimensional stability, chemical stability, increased strength and hardness, and improved abrasion resistance into cement and concrete products without substantially modifying the conventional procedures of accelerated curing.

U.S. Pat. No. 7,390,444 (Ramme et al.) describes a process for sequestering carbon dioxide from the flue gas emitted from a combustion chamber. In the process, a foam including a foaming agent and the flue gas is formed, and the foam is added to a mixture including a cementitious material (e.g., fly ash) and water to form a foamed mixture. Thereafter, the foamed mixture is allowed to set, preferably to a controlled low-strength material having a compressive strength of 1200 psi or less. The carbon dioxide in the flue gas and waste heat reacts with hydration products in the controlled low-strength material to increase strength. In this process, the carbon dioxide is sequestered. The CLSM can be crushed or pelletized to form a lightweight aggregate with properties similar to the naturally occurring mineral, pumice.

U.S. Pat. No. 8,114,367 (Riman et al.) describes a method of sequestering a greenhouse gas, which comprises: (i) providing a solution carrying a first reagent that is capable of reacting with a greenhouse gas; (ii) contacting the solution with a greenhouse gas under conditions that promote a reaction between the at least first reagent and the greenhouse gas to produce at least a first reactant; (iii) providing a porous matrix having interstitial spaces and comprising at least a second reactant; (iv) allowing a solution carrying the at least first reactant to infiltrate at least a substantial portion of the interstitial spaces of the porous matrix under conditions that promote a reaction between the at least first reactant and the at least second reactant to provide at least a first product; and (v) allowing the at least first product to form and fill at least a portion of the interior spaces of the porous matrix, thereby sequestering a greenhouse gas.

International Publication No. WO/2012/079173 (Niven et al.) describes carbon dioxide sequestration in concrete articles. Concrete articles, including blocks, substantially planar products (such as pavers) and hollow products (such as hollow pipes), are formed in a mold while carbon dioxide is injected into the concrete in the mold, through perforations.

Finally, U.S. Pat. No. 8,845,940 (Niven et al.) describes a process for forming concrete products by treating fresh concrete with carbon dioxide gas to form a treated concrete and then delivering the treated concrete to a product mold adapted to form the concrete products. In the method described the carbon dioxide gas is directed onto a surface of the fresh concrete or at a stream of the fresh concrete via a manifold with apertures in close proximity to the fresh concrete.

Each of the methods described above are not entirely successful at injecting the carbon dioxide evenly throughout the concrete mix, however, and this creates the potential for uneven curing or portions of the concrete with uneven structural properties. Accordingly, there is need for an improved system for treating concrete with carbon dioxide that overcomes these drawbacks in the prior art.

SUMMARY OF THE INVENTION

The invention comprises methods and apparatuses for putting relatively stable nano-sized $CO_2$ bubbles into concrete prior to it being shaped into its final application, be it a sidewalk, road, pipe, block, paver or any other final form. Addition of such $CO_2$ bubbles has potential effects of causing the concrete to cure faster and stronger, improve flowability of the mixture, and help make a more carbon-neutral material because of the absorbed $CO_2$ within the molded product.

In one aspect, the invention comprises a method for treating concrete prior to use within a mold such as within a concrete products forming machine. In the inventive method, a nanobubble-infused liquid is mixed into a dry concrete mix to form an infused wet concrete, where the nanobubble-infused liquid includes a concentration of nanobubbles of a gas at least 25% more than a natural concentration of nanobubbles of the gas within a natural state of the liquid. The nanobubble-infused liquid is preferably liquid water infused with a desired concentration of carbon-dioxide ($CO_2$) nanobubbles sized within a certain prescribed range. The infused wet concrete is then transported to the mold of a concrete products forming machine to form a molded product.

In another aspect of the invention, a method of retrofitting an existing apparatus for forming concrete products is described, where the apparatus comprises an existing component located upstream of a product mold and adapted to deliver treated concrete to the product mold. The retrofitting method adapts the existing component to treat fresh concrete to be delivered to the product mold by a new component with treated water infused with a concentration of carbon dioxide nanobubbles. The step of adapting comprises adding to the existing component a water delivery system that is configured to direct the treated water into the fresh concrete, where the water delivery system is provided with one or more liquid manifolds configured to dispense the treated water into the fresh concrete to form treated concrete.

Yet another aspect of the invention discloses an apparatus for delivering a wet concrete mix to a product mold. The apparatus comprises a hopper configured to retain a fresh concrete mix, a source of treated water having a concentration of nanobubbles of a gas at least double a natural concentration of nanobubbles of the gas within a natural state of the water, a water transport coupling the source of treated water with the hopper, a valve interposed within the water transport for selectively releasing the treated water into the hopper, and a mixer in communication with the hopper for mixing the treated water with the fresh concrete mix to yield an infused wet concrete.

The addition of a gas such as carbon dioxide via an infused liquid into the wet concrete mixture may promote an alternate set of chemical reactions in the concrete resulting in different reaction products. In particular, thermodynamically stable calcium carbonate (limestone) solids may be formed preferentially to calcium hydroxide (portlandite) products. The carbon dioxide may be solvated, hydrated and ionized in water in the concrete to produce carbonate ions. These ions may combine with calcium ions from the cement to precipitate calcium carbonate in addition to amorphous calcium silicates. In this way, carbon dioxide may be sequestered in the concrete blocks as a solid mineral. Excess gas, if any, may be vented away from the treated concrete mass. Otherwise, the production cycle of a given concrete product may remain generally unchanged.

The carbonated mineral reaction products may increase the early strength of the concrete. This may allow accelerated curing to be eliminated, or a reduction in time or temperature, or both. The energy consumption or total time, or both, of the concrete product making process may thereby be reduced. If steam curing would otherwise be used, then, depending on how the energy for steam curing is generated, there may be a further reduction in the greenhouse gas emissions associated with making the concrete products. The carbonated products may also exhibit one or more of decreased permeability or water absorption, higher durability, improved early strength, reduced efflorescence, and reduced in service shrinkage. The number of products that are damaged when they are stripped from the mold, conveyed or otherwise processed prior to packaging may also be reduced.

The foregoing and other objects, features and advantages of the invention will become more readily apparent from the following detailed description of a preferred embodiment of the invention that proceeds with reference to the accompanying drawings.

DETAILED DESCRIPTION

Figure 1:
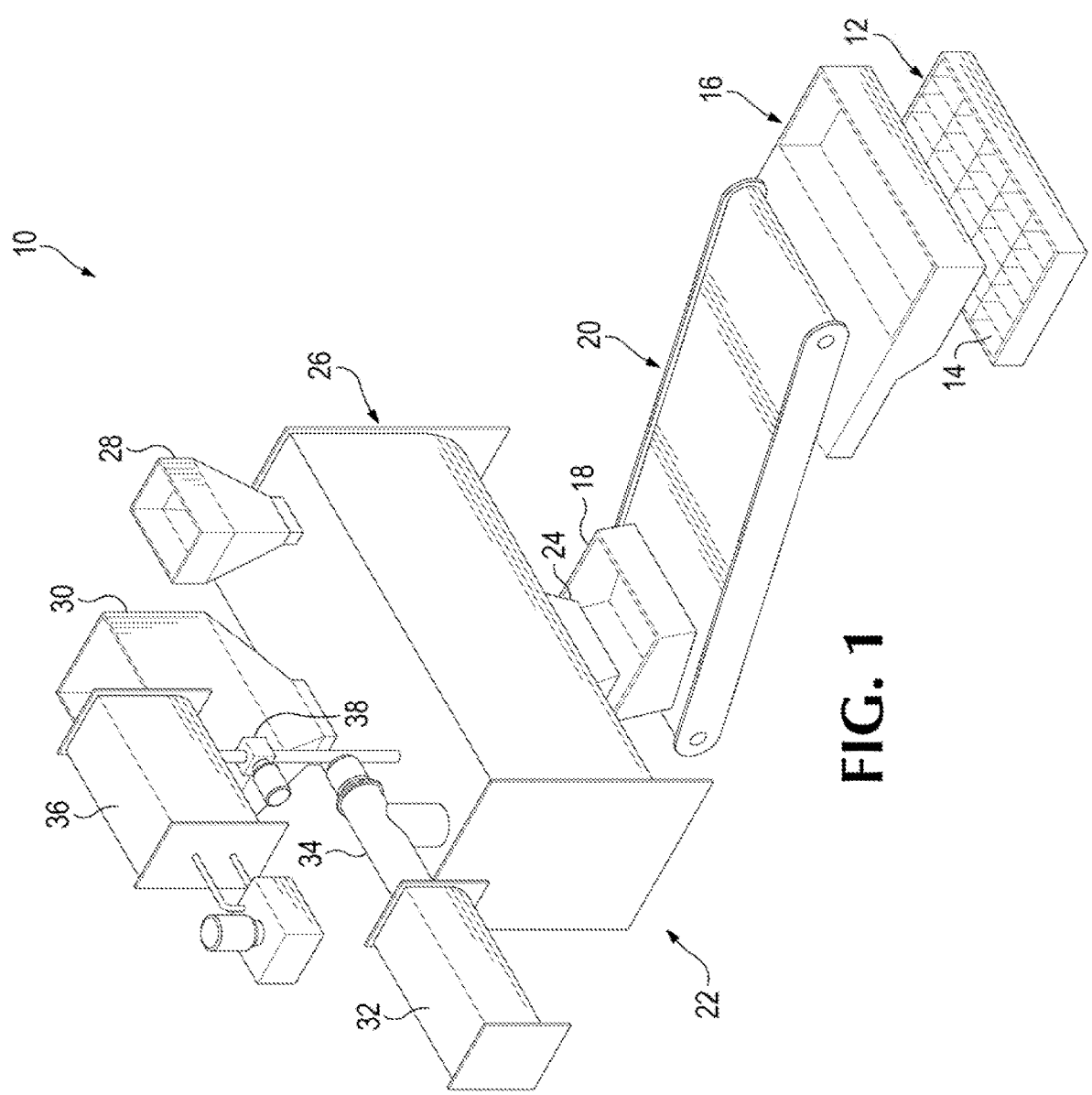
FIG. 1 is a schematic perspective view of a system for producing and delivering a nanobubble-infused concrete mixture to a product mold as implemented according to a preferred embodiment of the invention.

FIG. 1 illustrates a system 10 for producing and then delivering a wet concrete mix to a product mold, shown by mold box 12. The mold box 12 is typically configured with a plurality of cavities 14 sized, shaped, and arranged to yield a desired type of molded product such as blocks, pavers, decorative masonry units, tiles, and pipes. A wet concrete mix is delivered to these cavities 14 within the mold box 12 for a conventional molding process.

In the process shown, a feed drawer 16 is moved over the top of mold box 12 and empties its (wet concrete) contents into the cavities 14 of the mold box 12. The wet concrete is fed into the feed drawer 16 via a concrete delivery system, such as a feed bucket 18 that moves along a conveyor system 20 from a wet concrete forming stage 22 upstream of the process to the feed drawer 16. Wet concrete mix is received into the feed bucket 18 through a chute 24 formed at the bottom of a concrete mixing chamber 26. Mixing chamber 26 receives, in a preferred embodiment of the invention, dry ingredients as through hoppers 28, 30—typically a dry cementitious material such as Portland cement, and aggregate and/or sand, respectively. This dry material is combined within mixing chamber 26 with a wet slurry fed from slurry chamber 32 via manifold 34, and further wetted with a nanobubble-infused water generated and/or stored within tank 36 per features of the invention described further. The nanobubble-infused water within tank 36 is metered to the mixing chamber 26 via a valve and/or pump system 38, whereupon the full contents of chamber 26 are mixed together in the proper concentrations to form the desired mix of wet concrete. The wet concrete mixture is then controllably dropped into feed bucket 18 and delivered downstream on conveyor 20 to feed drawer 16 and thence to mold box 12.

Figure 2:
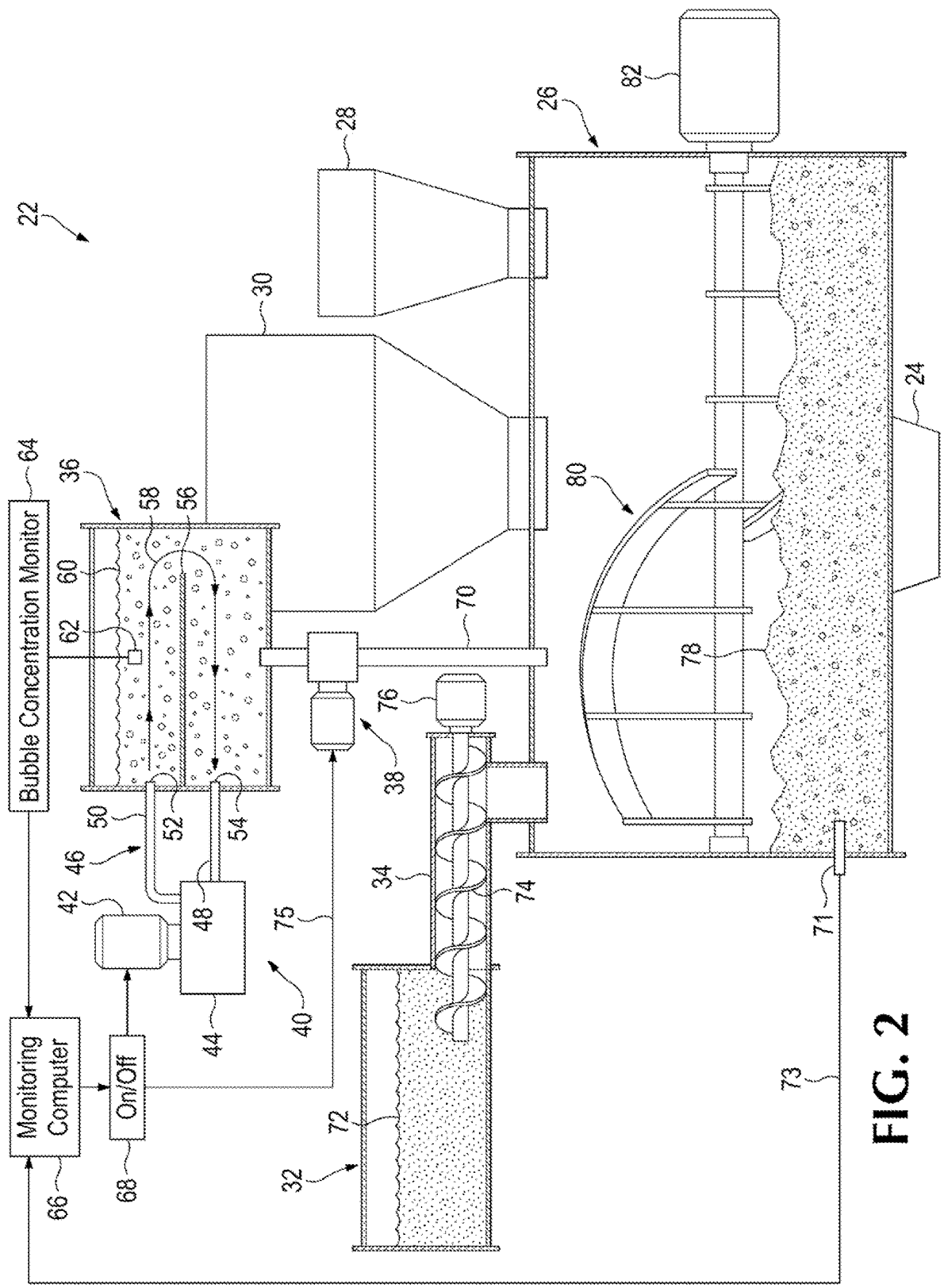
FIG. 2 is a side view of an upstream portion of the apparatus of FIG. 1 shown in partial section illustrating the apparatus for producing an infused wet concrete that can then be delivered to a product mold.

FIG. 2, in combination with FIG. 1, best illustrate the system and method for generating the nanobubble-infused water (also referred to herein as "nano-water") and delivering it to the mixing chamber 26 for entrainment within the resulting wet concrete. A nanobubble generator 40, here shown with a motor 42 that drives a pump 44, is inserted within a circulation loop 46 formed by pipes or tubes 48, 50 that couple to inlet port 52 and outlet port 54, respectively, within water tank 36. An impermeable baffle 56 extends in a longitudinal plane within the water tank 36 and is interposed between the inlet and outlet ports 52, 54 in order to force a longer flow path 58 and turbulent mixing of the nanobubble-infused water 60 throughout the water tank 36. Here, the infused water 60 is shown with bubbles of a variety of sizes; however it has been found that bubbles of nanobubble sizes are more stable and remain suspended in the water for a longer period of time as compared with larger bubbles, and that these larger bubbles quickly rise to the surface of the infused water 60 and escape to atmosphere.

Flow path 58, in combination with tubes 48, 50 and nanobubble generator 30, form the circulation loop 46 through which the nanobubble-infused water 60 travels. Bubble concentration sensor 62 is interposed within this loop 46 and measures the nanobubble concentration within the water 60, which it then communicates to monitor 64. Monitor 64 is in electronic communication with a monitoring computer 66, which connects with the machine controller to monitor the machine cycle and is programmed to activate the nanobubble generator 40 as via on/off switch 68. Monitoring computer can be programmed to activate generator 40 for so long as the nanobubble density measured by sensor 62 is outside a certain desired range, or alternately control the operation speed and other parameters of generator 40 so as to produce nanobubbles of various desired sizes.

Sensor 62 can take a variety of forms in order to detect nanobubbles within the water. For instance, bulk phase nanobubbles can be easily detected by diverse techniques including light scattering, cryoelectron microscopy (cryo-EM), transmission electron microscope (TEM) with a freeze-fractured replica method, and a resonant mass measurement technique that can simply and convincingly distinguish them from solid (or liquid emulsion) nanoparticles. Dynamic light scattering (DLS) uses the fluctuations in the scattering of laser light traveling through the sample solution. These fluctuations are due to the Brownian motion of the particles with larger bubbles giving greater scattering but slower fluctuations. Nanoparticle tracking analysis (NTA) is a related technique (e.g., NanoSight) that uses light scattering to track each individual bubble within a small volume (e.g., 100 μm×80 μm×10 μm, 80 pL), so ascertaining the exact concentration and the x- and y-movement in a given time. The speed of the particles is determined by their size with larger particles moving more slowly. Electrical sensing makes use of a Coulter counter. This is usually used in microbiology for counting cells and virus particles as they flow through a narrow channel between two vessels with each particle causing a change in the electrical resistance between the two vessels. The change in impedance is proportional to the volume of the particle traversing the channel due to its displacement of the liquid. In a similar way, such a device will also count and size bubbles flowing through the channel. Nanobubble solutions are characterized by the weighted equivalent hydrodynamic diameters of the nanobubbles, their concentration and size distribution. Different methodologies may result in different results for the same solution due to the way they average their data.

Although the motor 42 and pump 44 system is shown for nanobubble generator 40, it is understood that various other methods may be possible to generate nanobubbles within tank 36 of sufficient size and density as required for this invention. For instance, nanobubbles can also be made by electrolysis, by introducing gas into water at a high mechanical shear rate, through a 20-nm membrane filter, through porous glass and ceramics, from fluorocarbon droplets, from clathrate hydrate dissociation, by saturation at higher pressures followed by pressure drop, by saturation at low temperatures followed by a fast temperature increase (temperature jump), by high water flow creating cavitation, by a mixed vapor (e.g., nitrogen plus steam) condensation system, by mixing $CO_2$ gas and water, by decomposition of $H_2O_2$, by widespread gas introduction (e.g. dissolving fine magnesium powder), by use of a venturi tube, by acoustic cavitation, or by a combination of these processes.

A conduit 70 leads from a bottom of water tank 36 and empties into a top portion of the mixing chamber 26. Nanobubble-infused water 60 is thus drawn from water tank 36 upon activation of pump/valve 38 by control system, which can be part of the monitoring computer 66 or a separate control system. Existing moisture monitoring hardware and computer controls (resistive probe, microwave moisture, etc.) are employed to determine the amount of water required in the concrete mixture and appropriately meter any water required to be added. FIG. 2 illustrates a resistive probe 71 sunk within a lower portion of mixing chamber 26 and electrically coupled to monitoring computer 66 via connector 73. Based on readings by probe 71 of the moisture content of the treated mix 78, monitoring computer 66 selectively activates switch 68 when the moisture target is not yet achieved which then operates valve and/or pump system 38 via connector 75 to thereby meters additional nanobubble-infused water 60 into the mixing chamber 26 via conduit 70.

Figure 3:
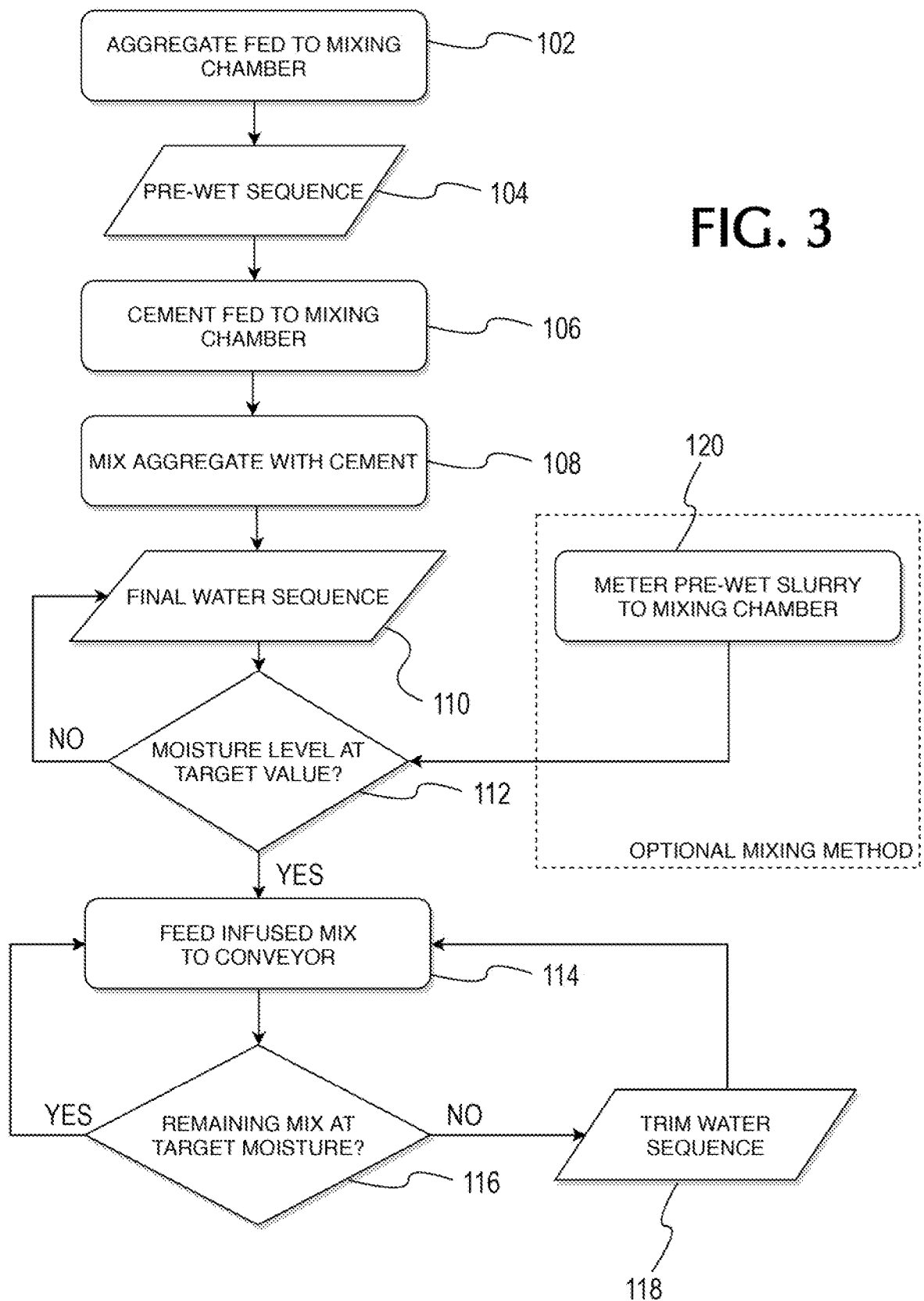
FIG. 3 is a flow chart illustrating steps for forming infused wet concrete according to embodiments of the invention.

FIG. 3 illustrates steps for forming a nanobubble-infused concrete according to embodiments of the invention. In general the water is added in three sequential stages; pre-wet water (block 104), final water (block 110), trim water (block 118). Pre-wet water is used to add the largest portion of water that gets all of the non-cementitious ingredients wetted. In block 102, aggregate and/or other dry materials are fed into mixing chamber 26 via hopper 30 in a ratio designated by the type of concrete desired. The pre-wet sequence is then operated in block 104 in which monitoring computer 66 operates flow valve/pump 38 to meter a designated gross amount of nanobubble infused water 60 from tank 36 into chamber 26, whereupon the mixture is then mixed by paddle 80 so that nano-water is evenly mixed into the non-cementitious material. Cementitious material is then metered into mixing chamber 26 via hopper 28 in block 106 and mixed with the pre-wetted aggregate in block 108 via paddle 80. A final water sequence is then operated in block 110 in which additional water is added after the cement has been introduced to the mixer and mixed for a period of time, bringing the total moisture level up to a prescribed value for the consistency needed for the concrete forming machine. Query block 112 is operated to determine whether the target moisture level is reached and, if not, additional water is metered via monitoring computer 66 as described above. The moisture level for query block is measured as via resistive probe 71, which is electrically coupled to monitoring computer 66 via connector 73. The infused mix can then be feed in block 114 into conveyor box 18 through chute 24 and relayed on demand via conveyor 20 to feed box 16 and thence to mold 12 as described further above in connection with FIG. 1. The remaining infused mixture 78 is retained within the mixing chamber 26 awaiting dispensing, but may vary over time from the target moisture level due to evaporation or hydration of the cement during mixing. Query block 116 determines whether target moisture is maintained. If so, then the infused concrete mix may again be dispensed in block 114. If the infused concrete moisture is off, then a trim water sequence is then initiated in block 118 to get even closer to the target moisture amount initially or after a period of time mixing when the moisture level may decrease due to evaporation or hydration of the cement during mixing.

Slurry chamber 32 is filled with a cement slurry 72 that is pre-wet an appropriate amount using treated water such as nanobubble-infused water 60 or regular untreated water. The slurry 72 is drawn out of chamber 32 in highly controllable metered amounts through a manifold 34 via auger 74 that is driven by motor 76. The pre-wet slurry 72 then falls into mixing chamber 26 in measured amounts to be mixed with the other materials from hoppers 28, 30 as illustrated in block 120 in FIG. 3 as an alternate wetting and mixing method from that described above. Adding the pre-wet slurry is a preferred method for yielding a treated concrete mix 78 as it allows the operator to get better control over the water-to-cement ratio and reduce mixing time. This method is an alternative to the conventional system of separately adding all the dry and wet ingredients. The treated concrete mix is mixed together within mixing chamber and not allowed to set up by action of mixing paddle 80 extending across the width of the mixing chamber 26 and driven by motor 82.

The slurry 72 would generally be delivered to chamber 32 in a pre-wet condition and would only need to be periodically mixed to keep the slurry 72 from setting up. However, an alternate method may add a supplemental amount of the nanobubble-infused mist-spray to fine-tune the target total moisture content of slurry 72. A separate pipe (not shown) would be needed with the slurry to adjust moisture right near the end of mixing. Pipe size from the nano-bubble water tank 36 to the mixing chamber 26, e.g. conduit 70, could probably match the one (not shown) to the slurry chamber 32. The cement slurry "box" 32 could thus include a small mixer (not shown) as an extension of the dispensing auger 74 coming out the side.

While the system 22 shown in FIG. 2 illustrates the generation of nanobubble-infused water in situ, e.g. during the molded products production process, it is understood that the nanobubble-infused water can be produced off-site and delivered to tank 36 whereupon it is metered as noted above. Delivery of nanobubble-infused water from off-site is possible because nanobubbles have been discovered to be maintained within the liquid and stable over much longer periods of time when compared with more typical large bubbles or even microbubbles. Whereas nanobubbles stay suspended within a liquid over weeks, large bubbles (>100µ diameter) rise rapidly (>6 m/sec) and directly to the surface of the liquid in a matter of seconds where they are then outgassed. And while microbubbles (1µ-100µ diameter) provide a higher surface area per unit volume than the commonly seen larger bubbles, they are not stable for long periods (~minutes), but instead rise slowly ($10^{-3}$ to 10 mm/sec) and indirectly to the surface. Smaller bubbles ($\approx$<20µ diameter), however, have been found to shrink over time to form more effective and stable nanobubbles. Only these tiny bubbles (<1 µm diameter) are stable for significant periods in suspension, rising at less than $10^{-2}$ µm/sec. This rise, however, is typically counteracted by Brownian motion of greater than 1 µ/sec so that the bubbles never reach the surface and outgas, but instead stay suspended within the liquid where they can be entrained within the wet concrete and consequently within the molded concrete products. Furthermore, as the pressure increases within the smaller nanobubbles, a greater amount of $CO_2$ can be maintained within the solution per volume than is possible with larger, less stable bubbles.

The amount of $CO_2$ naturally dissolved in water at 25° C. is around 1.5 grams per liter (or kg) of water. Experiments have shown that when infused with nanobubbles of $CO_2$, the amount of $CO_2$ dissolved in water in nanobubble form is greater than 30 grams per liter—a 20-fold improvement.

Research has further shown that a high-density of nanobubbles have been created in solution, and the heterogeneous mixture lasts for more than two weeks. The total volume of gases in these nanobubble solutions reached about 1% v/v under pressure in $1.9 \times 10^{16}$ 50-nm radius nanobubbles (equivalent to about 600 $cm^3$ when converted to standard temperature and pressure) per liter of water. These bubbles reduced the liquid density to about 0.9 $g/cm^3$ (e.g. 0.988 $g/cm^3$). Even higher concentrations have been reported on a small scale as the result of electrolysis with rapid changes of the polarity concentrations of nanobubbles (<200 nm) as high as $1.1 \times 10^{18}$ bubbles/liter with supersaturation of 500× being reported.

The preferred concentration of nanobubbles within a nanobubble-infused water 60 such as used in the invention is at least 25% more than that occurring in water in its natural state, with a further preferred value of twice the natural state value, an even more preferred value of 10-times the natural state value, and most preferably with a sufficient density so as to result in the treated water having a density of 0.9 $g/cm^3$.

Use of carbon dioxide in the manufacture of concrete products has been discovered to improve curing times, provide dimensional stability and chemical stability, increase strength and hardness, and improve abrasion resistance. However, it is projected that delivery of carbon dioxide via nanobubbles will have particularly effective benefits.

The delivery of carbon-dioxide to wet concrete via nanobubbles dissolved within water is proposed to have several advantages, including self-healing of the concrete to reduce or eliminate crack formation, and increasing the strength of the resulting concrete blocks. Use of a nanobubble-infused water can also potentially reduced the friction of the wet concrete, thus resulting in increased flowability of the concrete to make handling easier. Reduced friction would also result in an easier release of the concrete from the product mold. Finally, the use of water infused with nanobubbles of $CO_2$ can more efficiently sequester greenhouse gases by reducing the carbon footprint of concrete block production and enhance the efficient use of cement in the block formation process.

Having described and illustrated the principles of the invention in a preferred embodiment thereof, it should be apparent that the invention can be modified in arrangement and detail without departing from such principles. For instance, while water is the preferred liquid used to wet the concrete in the described process, there may be some other liquid that is similarly suitable for the process. Also, while carbon-dioxide is described as the preferred gas with which to form the infused water via microbubbles, other gases could potentially be used that give the moldable concrete material a desired property. Finally, while the described features of the invention are directed primarily to the use of a nanobubble-infused liquid in the formation of molded concrete products, it is understood that the resulting wet concrete can also be used within processes that utilize pour-in-place or pre-cast concrete purposes. Accordingly, we claim all modifications and variation coming within the spirit and scope of the following claims.

What is claimed is:

1. An apparatus for delivering a wet concrete mix to a product mold, the apparatus comprising:
    a mixing chamber;
    a hopper configured to retain a fresh concrete mix and deliver the fresh concrete mix to the mixing chamber;
    a source of treated water, the treated water having a concentration of nanobubbles of a gas at least 25% more than a natural concentration of nanobubbles of the gas within a natural state of the water;
    a nanobubble generator operatively coupled to the source of treated water to actively create the concentration of nanobubbles of the gas within the source, the nanobubble generator including a nanobubble generator pump, a source of gas, a storage tank, a detector within the storage tank, and a nanobubble generator loop comprised of the pump and tank through which the treated water is flowed to add an additional concentration of nanobubbles of the gas to the treated water;
    a water transport coupling the source of treated water with the mixing chamber;
    a valve interposed within the water transport for selectively releasing the treated water into the mixing chamber; and
    a mixer in communication with the mixing chamber for mixing the treated water with the fresh concrete mix to yield an infused wet concrete.

2. The apparatus of claim 1, further comprising a material transfer apparatus configured beneath the mixer for receiving the infused wet concrete from the mixer and delivering it to the product mold.

3. The apparatus of claim 1, further including a bubble concentration sensor interposed within the nanobubble generator loop.

4. The apparatus of claim 3, wherein the nanobubble generator is operated responsive to an output from the bubble concentration sensor corresponding to a measurement selected from the group consisting of a nanobubble density range and a nanobubble size range.

5. The apparatus of claim 3, wherein the bubble concentration sensor is selected from a group consisting of light scattering, cryoelectron microscopy, transmission electron microscopy, resonant mass measurement, dynamic light scattering, and nanoparticle tracking analysis.

6. The apparatus of claim 1, the apparatus further including a pre-wet cement slurry chamber coupled to the mixing chamber and configured to deliver a pre-wet cement slurry to the mixing chamber in combination with the treated water and fresh concrete mix.

7. The apparatus of claim 6, wherein the pre-wet cement slurry is pre-wet with the treated water.

8. The apparatus of claim 6, wherein the pre-wet cement slurry is pre-wet with regular untreated water.

9. The apparatus of claim 6, further including a motorized auger configured to draw metered amounts of pre-wet cement slurry from the pre-wet cement slurry chamber into the mixing chamber.

10. The apparatus of claim 1, further including a probe adapted to detect a moisture content of the infused wet concrete within the mixing chamber.

11. The apparatus of claim 10, wherein the water transport is operated responsive to moisture content detected by the probe so that additional treated water can be released into the mixing chamber if a moisture target for the infused wet concrete is not yet achieved.

12. The apparatus of claim 1, further including a source of $CO_2$ gas coupled to the apparatus.

13. An apparatus for producing a wet concrete mix, the apparatus comprising:
    a mixing chamber into which a fresh concrete mix and treated water is mixed together to form an infused wet concrete;
    a source of treated water having a concentration of nanobubbles of a $CO_2$ gas at least 25% more than a natural concentration of nanobubbles of the gas within a natural state of the water;
    a nanobubble generator operatively coupled to the source of treated water to actively create the concentration of nanobubbles of the $CO_2$ gas within the source, wherein the monitoring computer is further configured to operate the nanobubble generator, wherein the nanobubble generator includes a nanobubble generator pump, a source of gas, a storage tank, a detector within the storage tank, and a nanobubble generator loop comprised of the pump and tank through which the treated water is flowed to add an additional concentration of nanobubbles of the gas to the treated water, the monitoring computer configured to operate the nanobubble generator responsive to an output from the detector;
    a water transport coupling the source of treated water with the mixing chamber; and
    a monitoring computer configured to operate the water transport to deliver a desired amount of the treated water to the mixing chamber.

14. The apparatus of claim 13, further including a pre-wet cement slurry chamber coupled to the mixing chamber and configured to deliver a pre-wet cement slurry to the mixing chamber in combination with the treated water and fresh concrete mix.

15. The apparatus of claim 13, further including a feed drawer positioned to receive the infused wet concrete from the mixing chamber and transport the infused wet concrete to a mold box having a plurality of cavities.

16. The apparatus of claim 13, further including a probe adapted to detect a moisture content of the infused wet concrete within the mixing chamber and outputting a signal to the monitoring computer, the monitoring computer being configured to operate the water transport responsive to the moisture content detected by the probe so that additional treated water can be released into the mixing chamber if a moisture target for the infused wet concrete is not yet achieved.

* * * * *